United States Patent
Reiser et al.

(10) Patent No.: US 8,728,684 B2
(45) Date of Patent: May 20, 2014

(54) REDUCED AXIAL PRESSURE IN FUEL CELL STACKS

(75) Inventors: Carl A. Reiser, Stonington, CT (US);
Paravastu Badrinarayanan, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 606 days.

(21) Appl. No.: 12/737,106

(22) PCT Filed: Sep. 26, 2008

(86) PCT No.: PCT/US2008/011184
§ 371 (c)(1),
(2), (4) Date: Dec. 8, 2010

(87) PCT Pub. No.: WO2010/036222
PCT Pub. Date: Apr. 1, 2010

(65) Prior Publication Data
US 2011/0262830 A1    Oct. 27, 2011

(51) Int. Cl.
*H01M 8/00* (2006.01)
*H01M 8/24* (2006.01)

(52) U.S. Cl.
USPC .......................... 429/535; 429/469; 429/470

(58) Field of Classification Search
USPC ........................................ 429/469, 535, 470
See application file for complete search history.

(56) References Cited

U.S. PATENT DOCUMENTS

| | | | | |
|---|---|---|---|---|
| 2003/0096151 A1* | 5/2003 | Blunk et al. | | 429/34 |
| 2005/0095492 A1* | 5/2005 | Frank et al. | | 429/35 |
| 2006/0040166 A1* | 2/2006 | Budinski et al. | | 429/37 |
| 2006/0134498 A1* | 6/2006 | Hamm et al. | | 429/37 |
| 2007/0111068 A1* | 5/2007 | Gudlavalleti et al. | | 429/32 |
| 2008/0305380 A1* | 12/2008 | Andreas-Schott et al. | | 429/34 |
| 2009/0087717 A1* | 4/2009 | Akimoto | | 429/34 |

FOREIGN PATENT DOCUMENTS

WO    WO 2006109145 A1 * 10/2006    ............. H01M 8/24

OTHER PUBLICATIONS

N. Fekrazad and T. L. Bergman. The Effect of Compressive Load on Proton Exchange Membrane Fuel Cell Stack Performance and Behavior, J. Heat Transfer, Aug. 2007, 129 (8), 1004-1013.*

* cited by examiner

*Primary Examiner* — Carlos Barcena
(74) *Attorney, Agent, or Firm* — M. P. Williams

(57) ABSTRACT

Fuel cell stacks (20) include fuel cells (22) in which internal pressure on membranes (28), caused by adjacent cross points (19) or ribs (9, 17) of gas flow field plates (7, 33) is reduced by lowering the axial load holding the stack together, after an initial high axial load, that establishes minimal possible internal resistance, has been held for between a few hours and 20 hours. The need for robust axial load restraints is also reduced. Pressure of cross points (19) can also be spread by stiffening components or adding stiffeners.

9 Claims, 4 Drawing Sheets

REDUCED AXIAL PRESSURE IN FUEL CELL STACKS

TECHNICAL FIELD

The present modality reduces the axial load on a fuel cell stack, that is, the compressive force that binds the fuel cells into a stack, without any increase in resistance to axial electronic flow or loss of fluid seals. This reduction of axial loading reduces the weight and cost of permanent fuel cell axial load systems. Lower pressure at points of proton exchange membranes (PEMs) upon which the fuel cell stack axial loading pressure is concentrated reduces the rate of degradation of PEMs.

BACKGROUND ART

Fuel cells designed for use in portable applications, such as in vehicles, are advantageously of low weight, small volume and safe in all orientations (e.g., upside down). For these reasons, the proton exchange membrane (PEM) fuel cell has been widely developed for use in vehicles. Various forms of degradation have been noted; one form is flooding due to water migration to and accumulation at the cathodes when the fuel cell, at rest between uses, is cooled to very low temperatures, including below the freezing temperature of water. However, various methodologies have been proposed to overcome the water migration problem, such as draining and purging, to eliminate water before the fuel cell has time to cool.

On the other hand, there are degradations which have not had preventative or curative measures devised for them. One such fuel cell stack degradation involves the erosion of membranes as a consequence of interaction with contaminants which accelerate degradation. Although the performance degradation may hardly be noticed up to a point, perforation of the membrane does occur with crossover of reactant gas, typically hydrogen crossing to the cathode and mixing with oxygen. Combustion creates a hot spot which in turn may cause perforation of adjacent membranes, thereby participating in a cascading effect, with several or many fuel cells exhibiting crossover combustion. Several failed cells cause significant reduction in performance (voltage versus current density) as well as reduction in capacity (maximum load). Such perforations ultimately result in the need to completely rebuild or replace the fuel cell stack.

One known degradation accelerant is silica, which is nearly impossible to eliminate from the entire surface of both sides of all of the membranes in a stack. The silica reacts with the catalyst adjacent to the membrane to form silicates, thus eroding a portion of the membrane. Other contaminants which have the potential for causing excessive membrane degradation rates and possible perforation of the membrane include sulfates and chlorates.

A problem with several types of fuel cells, including phosphoric acid fuel cells and molten carbonate fuel cells, as well as PEM fuel cells, is the cost and the weight of the axial loading system. The bolts, nuts and the endplates are heavy and expensive.

SUMMARY

The modality herein is based on the discovery that the axial load required to maintain minimum internal resistance (IR) of the cells is much less than the axial load required to initially reach the minimum IR of the cells, whether that be at the first loading of the fuel cell stack during assembly or as a method for restoring performance and maximum electric load of a stack that has been in service for many tens of hours and has experienced slippage of cell elements as a result of operational heat and axial load.

The modality herein is also predicated on the discovery that excessive degradation rates, including perforation, and ultimate failure of proton exchange membranes of fuel cell stacks typically occurs at points of high mechanical stress in the membrane. A prime example is the cross point of the opposing ribs which define the reactant gas flow channels in the reactant gas flow field plates. These cross points carry a portion of axial load applied to the stack in the active area of the membrane, while the balance of the load is carried in the seal areas of each cell. The proportional split of the load is due to the specific material compositions of the individual stack components and the component dimensional specifications and tolerances. To reduce the degradation rate and the potential for perforations in a proton exchange membrane within a fuel cell stack, the force concentrated at particular locations of the membranes is reduced below the force that is normally applied to an operational stack.

The pressure imposed on the membrane is set by the axial loading of the cell stack. The pressure level to be applied is chosen to ensure proper fluidic sealing of the stack elements in order to prevent leaks of any kind, and to provide sufficient contact between the cell components, particularly between the membrane electrode assembly, the support plates (sometimes referred to as gas diffusion layers), and the separator plates (the reactant gas flow field plates) to result in a suitably low resistance for electronic conduction between the various components. In a typical PEM fuel cell configuration, the average pressure across an entire cross section of a fuel cell stack is on the order of 60 psi (415 kPa). This may range from about 55 psi (380 kPa) to about 65 psi (450 kPa), and possibly to 80 psi (552 kPa).

In a typical PEM fuel cell, the flow fields comprise numerous channels (grooves) interspaced with ribs. The orientation of fuel flow field channels may be orthogonal to the orientation of oxidant flow field channels; one typical layout has substantially horizontal fuel flow channels and substantially vertical oxidant flow channels. The cross points of the ribs of opposing flow fields adjacent to the membranes carry the axial load of the stack (minus the load on the seals). By virtue of having excessive pressure applied to the cross points, on one side by ribs in the fuel flow fields and on the other side by ribs in the oxidant flow fields, the resulting compressive force will accelerate the degradation rate of the membrane resulting from stack operation. This accelerated degradation rate may be further intensified by any contaminant in the membrane, such as silica, sulfates, chlorates, platinum or related materials.

In one embodiment of this modality which significantly reduces the rate of membrane degradation and potential membrane puncture, a high initial axial load is applied to the fuel cell stack during the initial assembly of the stack. The high initial axial load is that required to achieve the minimum possible contact resistance between components of the cells, and to achieve adequate sealing of the cells, such as on the order of 60 psi (415 kPa), or between about 55 psi (380 kPa) and 65 psi (450 kPa) in a PEM stack. Thereafter, before the stack is put into initial operation, the average axial load on the stack is decreased by at least about 60% to an ultimate axial load of on the order of 20 psi (137 kPa) or any load between about 15 psi (103 kPa) and about 25 psi (172 kPa) while maintaining adequate sealing and substantially minimum internal cell resistance.

It has been unexpectedly determined that the internal cell contact resistance at this lower axial load will remain essentially unchanged from the contact resistance at the high initial axial load, for as long as the reduced axial load is maintained, for the life of the stack. By reducing the axial load on the stack by more than half, the degradation of the membranes in the fuel cells as a consequence of operational parameters and/or the presence of degradation accelerants (contaminants) is significantly reduced. The lower axial load permits the use of a less robust (lower weight, lower cost) axial load system that can be used throughout the operational life of the stack.

Other embodiments may lower the localized cross point pressure level concentration by distributing the axial force pressure more evenly across the plane of the membranes. The improved pressure distribution may involve stiffening of the support plate or inserting a microperforated metal plate between the flow field plates and the membranes.

Variations will be apparent in the light of the following detailed description of exemplary embodiments, as illustrated in the accompanying drawings.

MODE(S) OF IMPLEMENTATION

Figure 1:
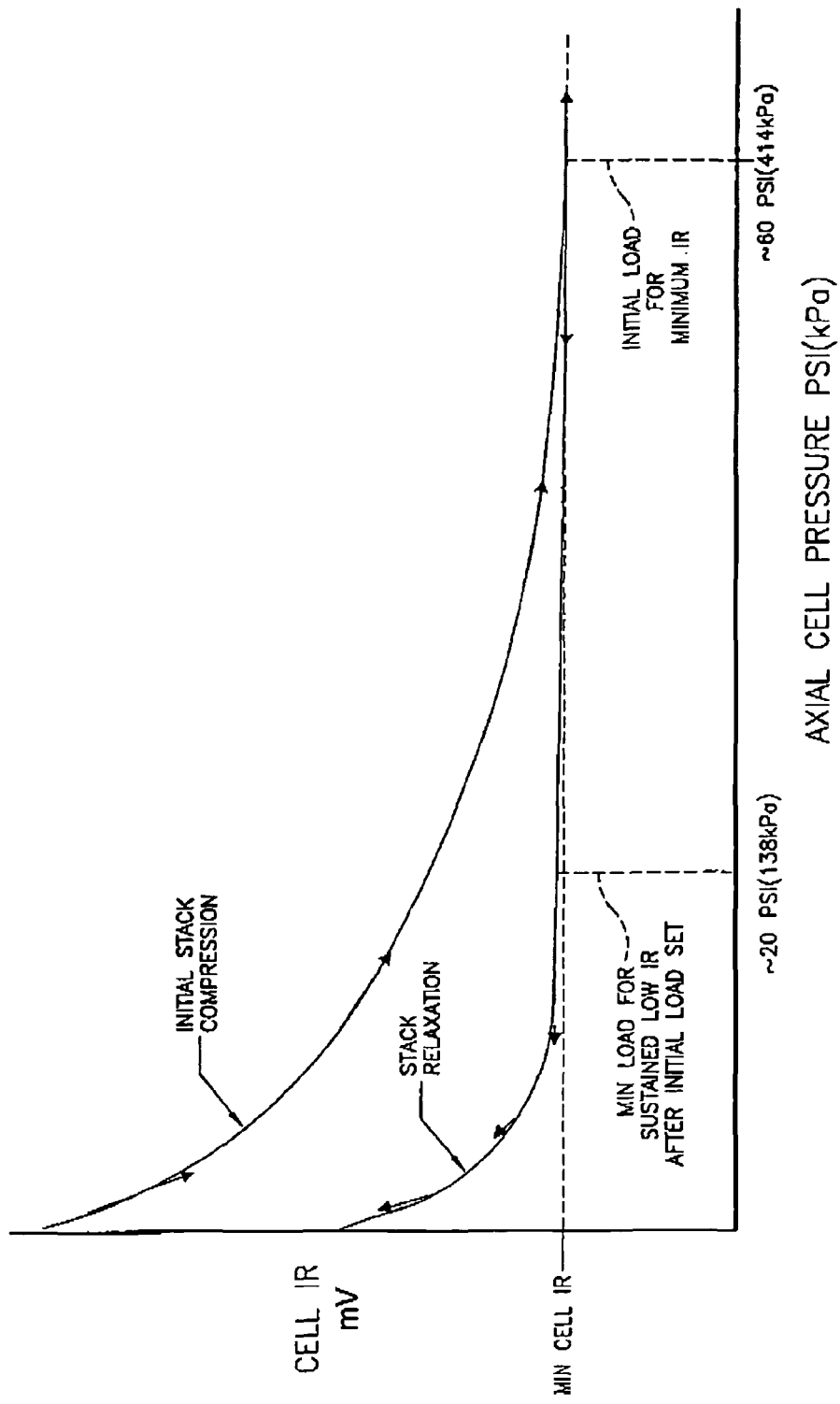
FIG. 1 is a plot of axial stack pressure versus cell internal resistance, illustrating the hysteresis effect that allows for the low axial loading of this modality.

The present modality takes advantage of the discovered characteristic of cell internal resistance as a function of axial loading. In FIG. 1, the cell internal resistance (IR) is expressed in terms of milivolts, the ordinate of FIG. 1 being unscaled. FIG. 1 clearly illustrates the hysteresis in the relationship between the IR and the axial load on the stack. Thus, according to the present modality, the minimum internal resistance of the stack is achieved with a relatively high axial load, such as about 60 psi (414 kPas) illustrated in FIG. 1. After a period of between a few hours and about 20 hours, the axial load may be reduced significantly, such as to on the order of one-third of the initial load required for minimum IR, such as to about 20 psi (138 kPa) as illustrated in FIG. 1.

In accordance with the present modality, when assembling a fuel cell stack, whether it be a PEM fuel cell, a phosphoric acid fuel cell, or a molten carbonate fuel cell, once the fuel cells are stacked in an orderly fashion (either horizontally or vertically, as the case may be) the axial load is applied and increased, along the curve marked "INITIAL STACK COMPRESSION", to the point where the minimum cell IR is reached, as is determined by conventional measurement techniques. Then, the stack is allowed to remain under the initial axial loading required for minimum IR, for some period of time (such as about 16 hours for a PEM fuel cell stack). The time to maintain the initial high axial loading may be reduced to only a few hours by increasing the stack temperature above room temperature. For a PEM stack, the temperature may be raised by between about 120° F. (50° C.) and about 160° F. (70° C.). The stack may be heated with hot air passed through gas or coolant channels. However, heating within coolant channels will avoid corroding the carbon material that supports the catalysts.

For other types of fuel cells, the time to maintain the initial axial load, and the temperatures to use to reduce that time, may be readily determined empirically. However, the time for any fuel cell will be between a few hours and about 20 hours.

Figure 2:
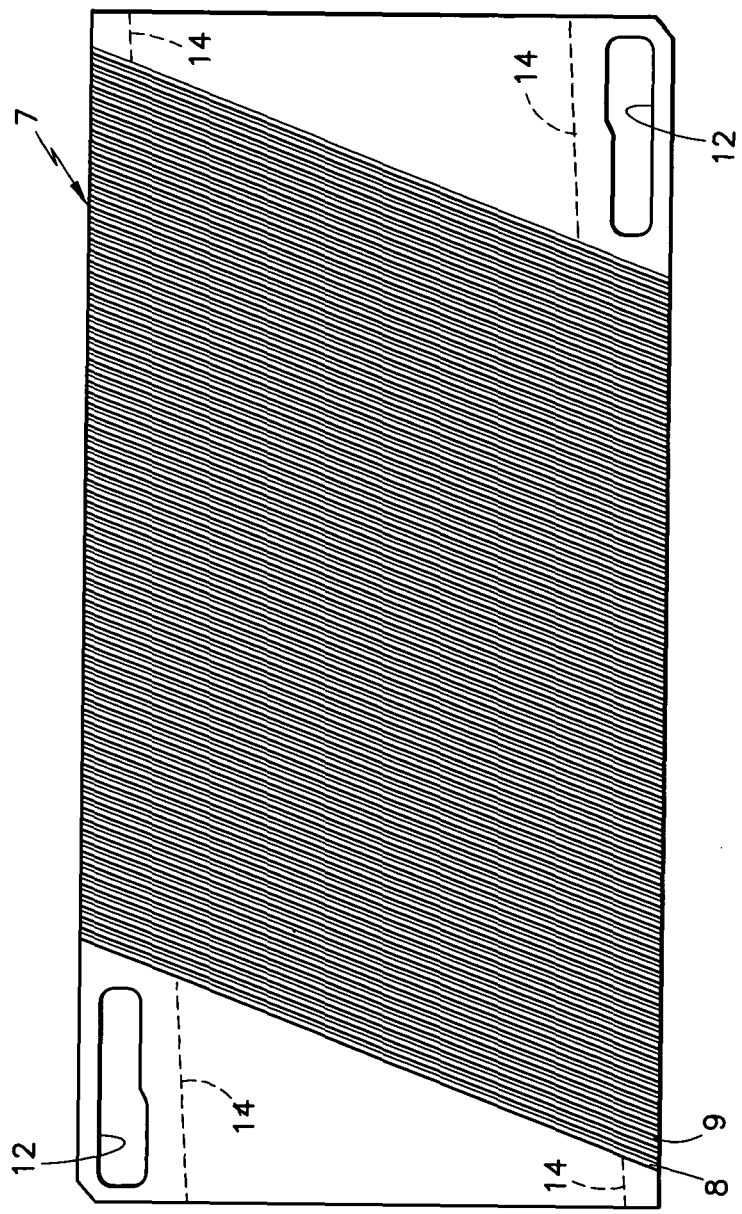
FIG. 2 is a front elevation view of a typical oxidant reactant gas flow field plate, with an indication of typical fuel reactant gas flow fields.

Referring to FIG. 2, an exemplary oxidant reactant gas flow field plate 7 includes a plurality of grooves 8 separated by ribs 9. In the example herein, it is assumed that the flow fields are equilateral in that the width and depth of the grooves are the same and the width of the grooves is the same as the width of the intervening ribs. However, the exact dimensional relationships of the width, depth and separation of the grooves can vary without altering the applicability of the modality herein to reduction of the rate of membrane degradation, erosion, and possible rupture/breakthrough.

In FIG. 2, the oxidant flow field grooves 8 are at an angle of about 21° with respect to the ends of the plate 7 so as to accommodate the presence of internal coolant manifold holes 12. The fuel flow field grooves are not shown in FIG. 2 for clarity. In the fuel flow field plates, the grooves will typically be substantially orthogonal to those in the plates 7. There is an angle of about 3° so that the fuel flow field grooves will not interfere with the coolant manifold holes 12, as illustrated by the dashed lines 14 in FIG. 2. The fuel flow field grooves are described with respect to FIG. 4, hereinafter.

Figure 3:
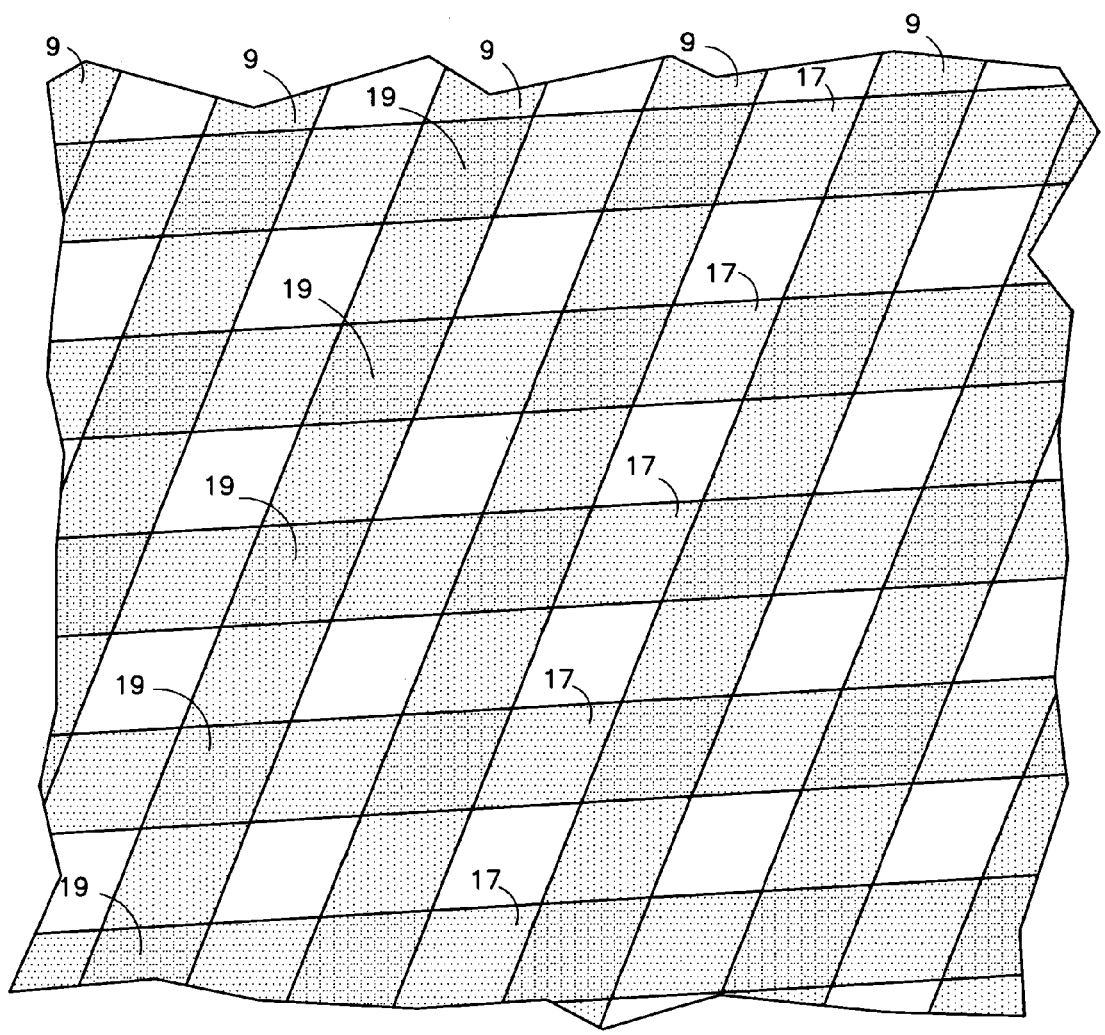
FIG. 3 is a stylized illustration of the spatial relationship between the ribs of the fuel reactant gas flow field and the ribs of the oxidant reactant gas flow fields.

FIG. 3 is a pictorial illustration of how the ribs 9 of the oxidant reactant gas flow field plate 7 apply force to the cathode side of a membrane as well as how the ribs 17 in a fuel reactant gas flow field plate (as described with respect to FIG. 4 hereinafter) apply force to the anode side of a membrane. The maximum force applied to a membrane and therefore the greatest stress will therefore be adjacent to the cross points 19 where the force applied by the ribs 9 intersect with the force applied by the ribs 17. It is at these small cross points 19 where the greatest degradation of the membrane will occur. The degradation rate may also be increased by the presence of a degradation accelerant and excessive pressure.

Figure 4:
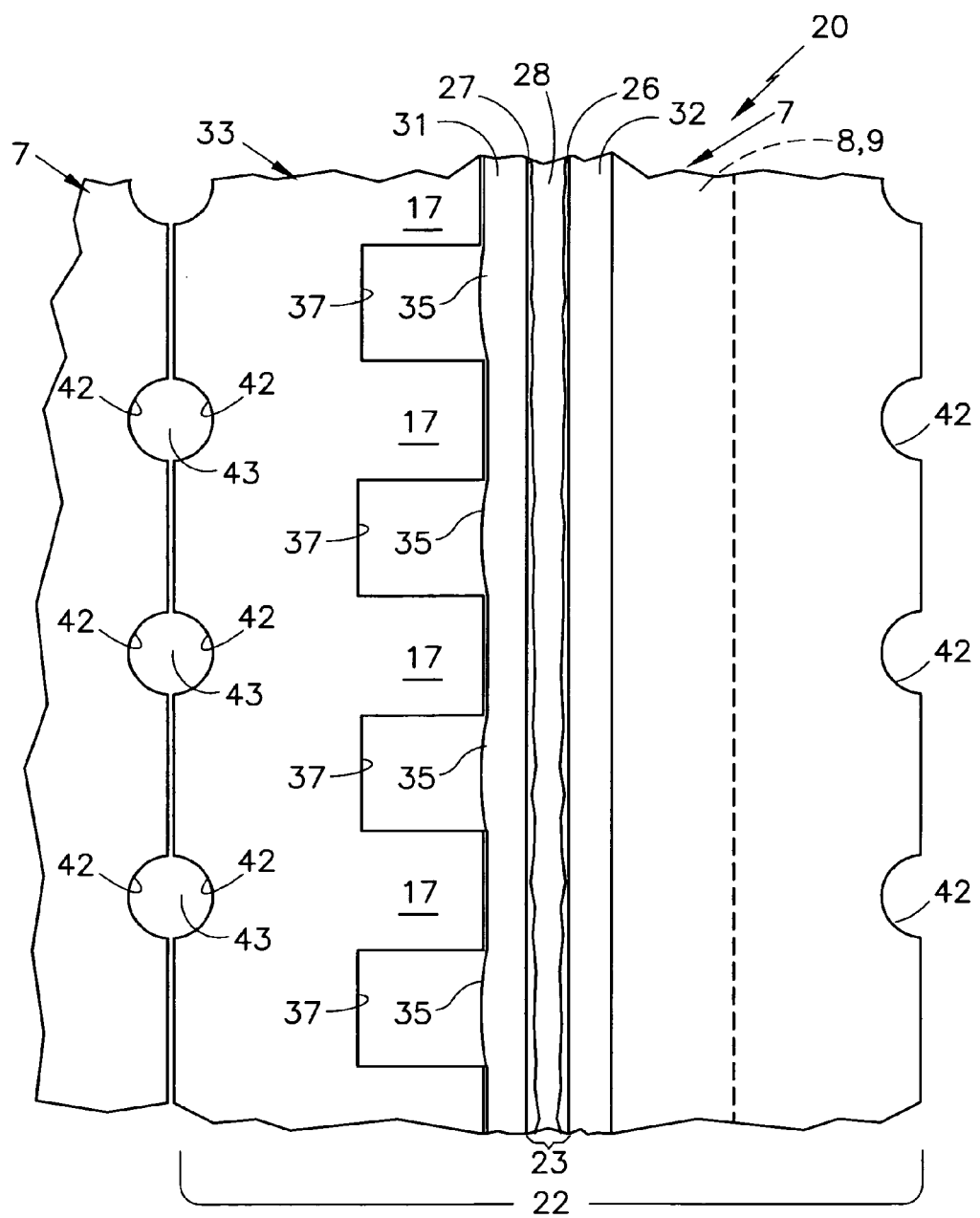
FIG. 4 is a fragmentary side elevation view of a fuel cell stack illustrating deformation of a support plate as a consequence of pressure applied by fuel reactant gas flow field ribs.

Referring to FIG. 4, a fuel cell stack 20 includes many fuel cells, such as a fuel cell 22 having a membrane electrode assembly (MEA) 23 which has a cathode catalyst layer 26 and an anode catalyst layer 27 disposed on opposing surfaces of a proton exchange membrane 28. On either side of the MEA 23 are gas diffusion layers (GDLs) 31, 32, which are sometimes referred to as support plates or collection layers. The GDLs comprise a bilayer, or other fine-pore layer, on the catalyst side of a substrate; or the GDLs may not have an additional layer. The GDLs 31, 32 conduct electricity from the electrode catalyst layers 26, 27 to the ribs 9, 17 of the adjacent flow field plates 7, 33. The GDLs 31, 32 also spread the pressure applied by the ribs 9, 17 to the MEA 23. However, as is illustrated by the bulges 35 of the GDL 31 into the fuel flow field grooves 37, portions of the GDL 31 which are contacted by the ribs 17 are compressed somewhat. Thus, the force applied between the oxidant reactant gas flow field plate 7 and the fuel reactant gas flow field plate 33 is concentrated at the points where the ribs 17 contact the GDL 31, in a manner illustrated by the intersections 19 of the ribs 9, 17 of FIG. 3.

Typically, each reactant gas flow field plate 7, 33 may have grooves 42 which abut against each other when the fuel cells are arranged in a stack, so as to form coolant flow paths 43 which are in fluid communication with coolant manifold holes 12, shown in FIG. 2. The flow field plates 7, 40 may be porous and hydrophilic, in which case they are frequently referred to as water transport plates.

The hysteresis effect of axial load on internal resistance, shown in FIG. 1, allows the load reduction step to be used as a tool to lower the membrane degradation rate, as well as to permit use of less robust permanent axial load systems. As the initial axial load is applied to the stack, the internal resistance of the fuel cells decrease along the line marked "INITIAL STACK COMPRESSION". However, when the axial load is decreased along the line marked "STACK RELAXATION", there is little if any increase in internal resistance, with loads below one-third of the initial axial load.

Reduction of the pressure exerted through the GDLs 31, 32 by the ribs 9, 17 according to the present modality, will reduce the effective degradation rate of the membrane 28. In one PEM fuel cell embodiment, the pressure is reduced by at least 60% of the load on the fuel cell stack.

As an example, in a PEM fuel cell, an initial axial load of about 60 psi (415 kPa), on average, across any cross section of the stack, is maintained at room temperature for a time period, on the order of 16 hours, more or less, and then the axial load is reduced to an ultimate axial load below about 60% of the initial load, such as between about 15 psi (103 kPa) and about 25 psi (172 kPa) with almost no increase in the minimal internal resistance from that which was present at the initial loading, and without any reduction in the adequacy of fluid seals. In any embodiment of this modality, the pressure is therefore reduced to less than half the normal pressure for a stack having similar fuel cells and seals, which provides a significant reduction in the effect that contaminants will have on degradation rate of the membranes, and significant reduction in cost and weight of axial load restraints.

The pressure adjustments are accomplished in the conventional manner, such as by adjusting the torque on the tie-bolts. It should be noted that setting of the initial axial load on the stack and the time required to maintain that load before adjustment to the lower operational load is significantly variable. This variability is primarily a function of the initial pressure setting, time held at the initial pressure, and temperature of the stack during loading. Other variables include the stack length or height (i.e., number of cells) and component element types and their material make up.

The maximum (concentrated) pressure applied to the membrane by the ribs 9, 17 may be reduced in other ways, such as by stiffening of the support plates 31, 32 by laminating layers, by using different material of construction or other stiffening techniques so as to spread the force more evenly. Or a metal plate with microperforations may be used between the flow field plates 7, 33 and the electrode catalyst layers 26, 27.

The invention claimed is:

1. A method, characterized by:
   (a) imposing initial axial loading of a fuel cell stack, by adjusting torque on tie-bolts, sufficient to fluidically seal said stack and provide minimum possible internal cell resistance to electronic conduction between components of said stack;
   (b) maintaining said initial axial loading for a period of time between more than one hour and about 20 hours by retaining the tie-bolt torque established in step (a);
   (c) thereafter, reducing the axial loading of said stack, by adjusting torque on tie-bolts, to an axial loading, below about 50% of said initial axial loading, which maintains substantially said minimum possible internal cell resistance.

2. A method according to claim 1 further characterized in that:
   axial loading is reduced in step (c) to between 25% and 40% of said initial axial loading.

3. A method, characterized by:
   rejuvenating a fuel cell stack in order to restore performance and/or maximum electrical load by a process including the method of claim 1.

4. A method according to claim 3 further characterized in that the initial axial loading imposed on the fuel cell stack in step (a) is between about 55 psi (379 kPa) and about 65 psi (448 kPa) and the axial loading is reduced in step (c) to between about 15 psi (103 kPa) and about 25 psi (172 kPa).

5. A method of imposing axial loading of a proton exchange membrane fuel cell stack according to claim 1.

6. A method of reducing the rate of deterioration of proton exchange membranes in a stack of fuel cells, characterized by:
   altering axial loading of said fuel cell stack, by adjusting torque of tie-bolts, so as to reduce, by at least 40%, pressure applied to active areas of the membranes as the result of compressive force applied by ribs of reactant gas flow field plates imposed by axial loading of the stack of fuel cells.

7. A method according to claim 6 further characterized in that:
   axial loading is adjusted from an initial axial loading of between 55 psi (379 kPa) and 80 psi (552 kPa) and an ultimate axial loading of between 15 psi (103 kPa) and 25 psi (172 kPa).

8. A method according to claim 6 further characterized in that:
   axial loading is adjusted from an initial axial loading of between 55 psi (379 kPa) and 65 psi (448 kPa) and an ultimate axial loading of between 15 psi (103 kPa) and 25 psi (172 kPa).

9. A method of manufacturing a fuel cell stack which comprises aligning a plurality of fuel cells into a stack; characterized by:
   applying an axial compressive load on said stack, by adjusting torque on tie-bolts, which load is, on average across a cross section of said fuel cell stack, between about 55 psi (379 kPa) and 65 psi (448 kPa), and after a period of time between more than one hour and about 20 hours, reducing the axial load on said stack, by adjusting torque on tie-bolts, to between about 15 psi (103 kPa) and about 25 psi (172 kPa).

* * * * *